Dec. 23, 1941.  R. L. PATTERSON  2,267,041
METALLURGICAL FURNACE
Filed March 12, 1941  3 Sheets-Sheet 1
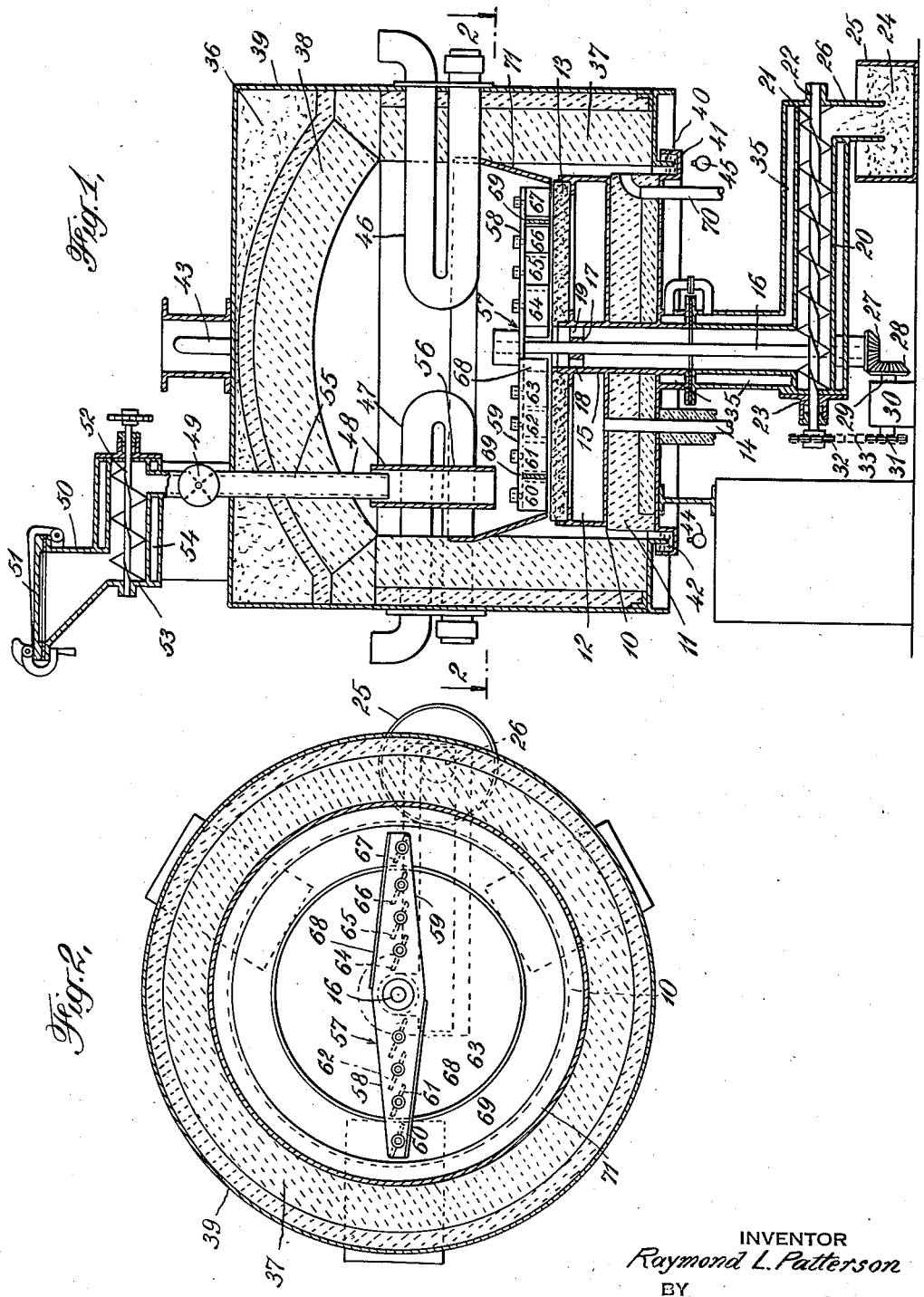
INVENTOR
Raymond L. Patterson
BY
Pennie, Davis, Marvin and Edmonds
ATTORNEYS

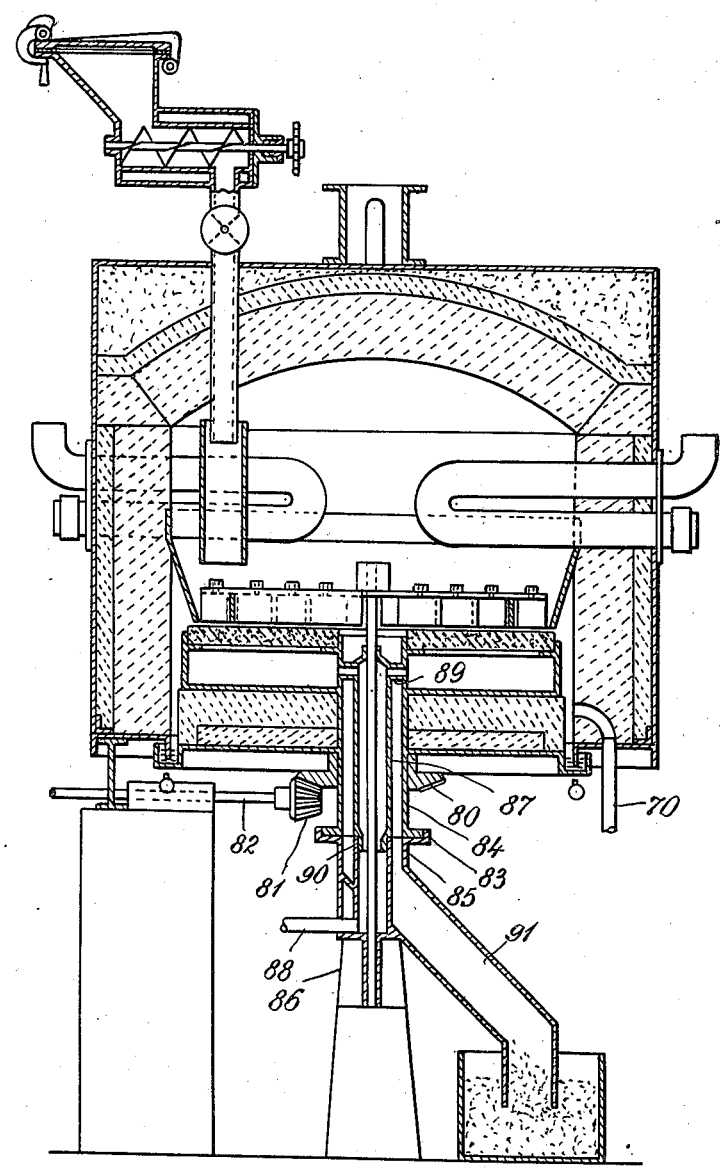

Dec. 23, 1941.    R. L. PATTERSON    2,267,041
METALLURGICAL FURNACE
Filed March 12, 1941    3 Sheets-Sheet 3

INVENTOR
Raymond L. Patterson
BY
ATTORNEYS

Patented Dec. 23, 1941

2,267,041

UNITED STATES PATENT OFFICE 2,267,041

METALLURGICAL FURNACE

Raymond L. Patterson, New York, N. Y., assignor, by mesne assignments, to Hardy Metallurgical Company, New York, N. Y., a corporation of Delaware Application March 12, 1941, Serial No. 382,903

13 Claims. (Cl. 266—24)

This invention is concerned with metallurgical furnaces and aims to provide improved furnaces particularly adapted for the heat treatment of finely-divided material that is maintained during the treatment in a substantially solid state. Thus, the furnace of my invention is especially adapted to the treatment of finely-divided metals or compounds thereof with gaseous reagents and finds application in the treatment of metal powders with carburizing or nitriding atmospheres and in the reduction of finely metallic compounds, such as, oxides of iron or copper, with gaseous reducing agents, such as, hydrogen or carbon monoxide.

Frequently, in the heat treatment of powdered metals and metal compounds in the solid state, the powders tend to frit with resultant formation of accretions on the furnace structure and of agglomerates which are difficult to treat.

I have developed an improved furnace in which the formation of accretions and agglomerates is much reduced, from which the accretions and agglomerates that do form may be removed with ease, and in which hydrogen or other explosive gases may be employed with safety. With these objects in view, my invention contemplates in a metallurgical furnace the combination which comprises a porous hearth, a rabble disposed above said hearth and adapted to move finely-divided solid material thereover, means for imparting rotary movement between the rabble and the hearth, means for forcing gas upwardly through the porous hearth, a removable furnace shell extending above the hearth and enclosing the rabble and having a joint with the hearth, and means for sealing the joint between the shell and the hearth. In the preferred form of my furnace structure, heat is supplied by means of one or more radiant heaters disposed within the furnace shell above the rabble and mounted on the wall of the shell, and the seal between the furnace shell and the hearth is made by a peripheral lute which, conveniently, is filled with metal that is molten, at least when it becomes necessary to remove the shell.

The hearth of the furnace is porous and preferably consists of an upper wall of porous refractory having small tortuous passages therethrough, the porous wall being underlain by a chamber into which the gaseous reagent is fed under pressure.

The rabble and the hearth are rotatable with respect to each other. Thus, the rabble may be held stationary while the hearth is rotated, in which case one part of the peripheral lute fastened to the hearth also is rotated while the other part of the lute that is fastened to the furnace shell is kept stationary. On the other hand, the hearth may be kept stationary while the rabble is rotated by means of a shaft projecting upwardly through the hearth.

The material being treated by the gaseous reducing agent may be moved by the rabble either inwardly or outwardly on the hearth. The rabble comprises a rotatable outwardly extending arm bearing a plurality of rakes set at an angle so that they tend to move the material in a spiral path either inwardly or outwardly on the hearth depending upon the direction of rotation. Drop holes for treated material to be removed from the furnace are provided at the center of the hearth or at its outer edge depending upon the direction of movement of the material across the hearth. My preferred form of apparatus provides a single central drop hole and the movement of material is inward across the hearth.

The material being moved across the hearth is kept in a state of semi-suspension by means of the gas which is admitted upwardly through the hearth. Preferably, the material is maintained as a thin and relatively uniform bed. This may be done by placing a leveling bar or the like on the rabble.

The heating elements may be of any suitable type but preferably are in the form of radiant tube heaters of return bend formation that project through the wall of the shell and are heated internally by means of hot gases. If desired, radiant heaters of the electrical resistance type may be provided and mounted in the same way.

The hearth may be built of any suitable porous refractory. However, for the treatment of metal powders, a hearth of refractory containing a small amount of finely-divided metal is recommended, because metal powder tends to adhere to such a hearth but slightly, if at all. Thus, in the treatment of iron oxide to form iron powder or in the carburizing or nitriding of iron powder in the furnace of my invention, it is desirable to have a porous hearth of silicon carbide or the like containing up to 50% of finely-divided iron. On such a hearth, there is little tendency for the iron powder to adhere.

When hydrogen is employed as a reducing agent with resultant formation of water vapor within the furnace, it is desirable to withdraw gas from the furnace at a level below that of the hearth. Water vapor is substantially heavier than hydrogen and tends to sink in the furnace. By withdrawing the water vapor from a level below the hearth and by providing a barrier to prevent the water vapor from coming in contact with freshly reduced metal powder, undesirable re-oxidation of the latter may be substantially prevented.

These and other features of my invention will be more thoroughly understood in the light of the following detailed description taken in conjunction with the accompanying drawings in which:

Fig. 1 is a sectional elevation through a preferred form of the furnace of my invention adapted particularly for the reduction of iron oxide with hydrogen;

Fig. 2 is a plan of the apparatus of Fig. 1;

Fig. 3 is a fragmentary elevation showing a modification of the apparatus of Fig. 1 in which the hearth may be rotated while the rabble is held stationary;

Figure 4:
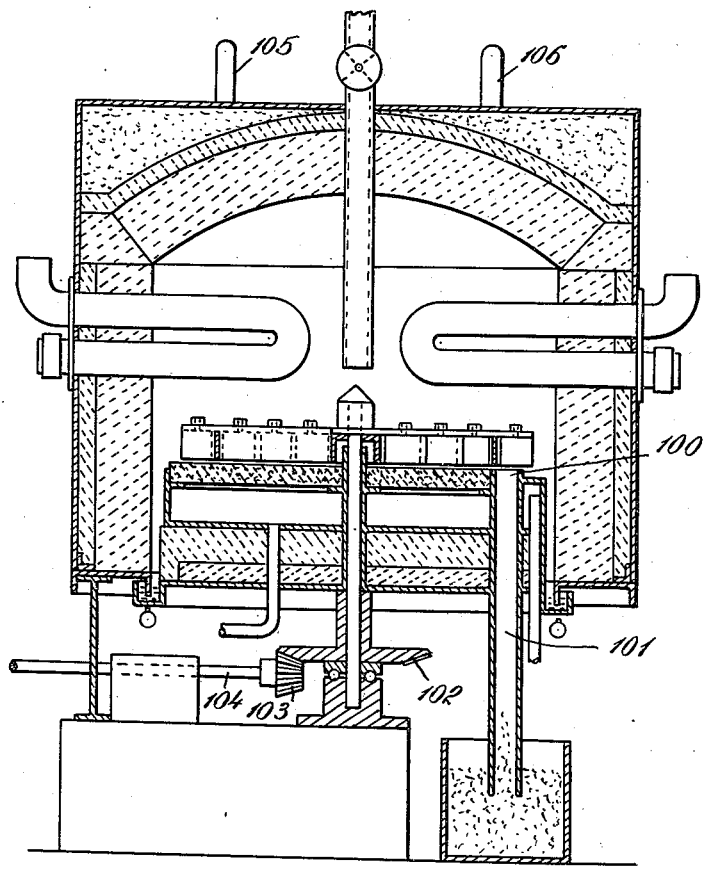
Fig. 4 is a fragmentary elevation of another modification of the apparatus of Fig. 1 in which the material is moved outwardly across the hearth instead of inwardly.

The furnace illustrated by Figs. 1 and 2 comprises a hearth 10 that is circular in plan and has a lower refractory wall 11 upon which an annular gas chamber 12 rests. The upper wall of the annular gas chamber is formed by an annular piece 13 of porous refractory. Gas, for example, hydrogen, may be admitted into the chamber of the hearth through a conduit 14 that projects upwardly through the lower refractory wall thereof.

The hearth is provided with a central drop pipe 15 that projects downwardly through it. Disposed concentrically within the drop pipe is a drive shaft 16 which is substantially smaller in diameter than the drop pipe so as to leave ample space for the removal of treated material from the hearth. The drive shaft is journalled adjacent its upper end in a removable bearing 17 which is fastened by means of spokes 18, 19 to the drop pipe. The space between the spokes permits material to fall through the pipe. An outwardly projecting conveyor housing 20 is joined to the drop pipe at the bottom thereof. A screw conveyor 21 journalled in bearings 22, 23 at each end of the housing is provided for moving material laterally from the bottom of the drop pipe into a well 24. The well comprises a container 25 and a pipe 26 which projects downwardly into it from the outside end of the conveyor housing. A body of material in the container extending above the bottom of the pipe seals the well.

The drive shaft in the drop pipe passes through the bottom of the conveyor housing and bears a miter gear 27 on its lower end. This gear meshes with a second miter gear 28 attached to a substantially horizontal shaft 29 of a conventional driving means 30, such as a motor or speed reducer. The opposite end of the shaft 29 is connected by means of a pair of sprockets 31, 32 and a chain 33 to the drive end of the screw conveyor 21.

The drop pipe below the hearth structure and the conveyor housing are provided with a cooling jacket 35 with which a cooling fluid may be passed.

The hearth is enclosed by a removable furnace shell 36 comprising a cylindrical wall 37 of refractory and a domed top 38 which are enclosed by a metal casing 39. A lute ring 40 of metal or the like is mounted horizontally on the bottom of the wall of the shell and projects into a peripheral channel 41 carried by the hearth. Material 42, for example, molten metal, is placed in the channel to form a peripheral lute or seal at the junction of the hearth and the shell.

A lifting eye 43 is mounted centrally on top of the shell casing so that the entire shell can be lifted upwardly and removed from the hearth by means of a crane or other conventional lifting mechanism, not shown.

The furnace structure is supported in a conventional manner on a plurality of piers disposed below the hearth.

If desired, a plurality of gas burners 44, 45 or other heating means may be provided, immediately below the annular channel or lute, for melting the metal of the lute or for maintaining it in a molten condition. In operation, it may be unnecessary to keep the metal in molten condition at all times, but it should be melted at least when the furnace shell is to be removed.

A plurality of heating elements, such as, radiant tubes 46, 47, are mounted in the cylindrical wall of the removable shell. As shown, these comprise return bends of metal or heat conductive refractory. A burner, not shown, is mounted in the lower end of each radiant tube and plays a flame through the tube so that the walls become hot and preferably incandescent. Gaseous, liquid, or pulverized solid fuel may be used in the burners. Conveniently, the burners are provided with flexible or easily removable connections for air and fuel.

A charge pipe 48 extends downwardly through the top of the furnace to a point just above the outside edge of the hearth. The charge pipe is provided with a star feeder 49 or other positive sealing means. Charge is delivered to the charge pipe from a hopper 50, which should be provided with a tight cover 51. To facilitate movement of charge from the hopper, it may be convenient to employ a screw conveyor 52 mounted in a housing 53 provided with a cooling jacket 54 through which fluid may be passed.

The charge pipe is composed of an upper portion 55 of small diameter which is telescoped into a lower portion of greater diameter 56. The lower portion is entirely within the furnace chamber. There is an annular space where the two portions of the charge pipe come together. Hydrogen or other gas in the furnace may enter the lower portion of the charge pipe at this point and so come immediately into contact with freshly introduced charge.

A rotatable rabble 57 (comprising centrally mounted outwardly extending arms 58, 59 with a plurality of conventional rakes, 60, 61, 62, 63, 64, 65, 66, 67 on their lower sides) is disposed immediately above the porous hearth and is mounted on the upper end of the drive shaft by which it is rotated. In the preferred embodiment of the furnace of my invention for use in the reduction of finely-divided metal compounds with hydrogen, the bottoms of the rakes clear the hearth by only a short distance, say, one-quarter of an inch. The rakes are set in a conventional manner at an angle to the arms so that they tend to move the material in a spiral path toward the drop hole in the center of the furnace as the arms are rotated clockwise (Fig. 2).

To assure that the bed of the material, say, iron oxide, undergoing treatment on the hearth is kept thin and relatively uniform, a horizontally disposed leveling beam 68 is fastened to one or both of the rabble arms with its lower edge a short distance above the hearth. If desired, the height of the bottom of the leveling beam may be adjusted to regulate the depth of the charge.

An annular vapor barrier 69 is mounted concentrically on the rabble in a horizontal position so that it clears the hearth by a short distance, say, one-half inch. The vapor barrier is located about two-thirds of the distance out from the center of the hearth and is adapted to prevent heavy gaseous reaction products, such as, water vapor, from flowing back in contact with the solid reaction product, say, iron powder, that is leaving the furnace from the center drop hole. The vapor barrier is set closer to the hearth than is the leveling beam so that the bed is kept deep enough to seal the space underneath the barrier. The rakes, however, are set closer to the hearth than is the barrier to assure that the material of the bed is moved underneath the barrier toward the drop hole.

Heavy gaseous reaction products, say, water vapor, are withdrawn from the furnace through an outlet pipe 70 the top of which is below the level of the bed on the hearth. Conveniently, the top of the outlet pipe is in the refractory bottom of the hearth and communicates with the annular space between the hearth and the shell immediately above the peripheral lute.

To prevent material from falling off the outside edge of the hearth into the space between the hearth and the cylindrical wall of the shell, a splash or lute ring 71 is provided. This ring is an inverted frusto-conical section and is fastened at its upper edge to the wall of the furnace shell.

In the operation of the furnace illustrated by Figs. 1 and 2, in reducing iron oxide (say, fine magnetite concentrate) to iron powder, hydrogen being employed as the reducing agent, the interior of the furnace is first purged of oxygen as completely as possible. This may be done by forcing oxygen free gases (i. e., hydrogen, flue gases or nitrogen) through the furnace chamber. Thus, flue gases can be forced through the hydrogen inlet pipe into the gas chamber and thence through the porous upper wall into the furnace chamber proper. From the furnace chamber, these gases plus any entrapped oxygen are removed through the outlet pipe. This purging operation should continue until analysis of the gas leaving the exhaust pipe shows it to be oxygen-free. After the furnace chamber has been purged, it is safe to begin the reduction of iron oxide with the hydrogen. To this end, the iron oxide is dropped onto the hearth through the charge pipe while hydrogen is forced through the porous hearth, the rabble being rotated and heat being supplied to the furnace chamber by means of the radiant heaters. The iron oxide is rapidly reduced to iron without fusion at a temperature of about 850° C. The iron powder is raked across the hearth and falls through the drop hole to the screw conveyor at the lower end thereof which conveys the iron powder through the housing to the well. The powder should be cooled practically to atmospheric temperature before it discharges into the well, for hot finely-divided iron is pyrophoric even at temperatures slightly above atmospheric and so may be re-oxidized rapidly unless precautions are taken to prevent this.

From time to time, it may be desirable to clean the furnace, for example, when a different type of product is to be made therein. In such case, cleaning is easily accomplished by removing the furnace shell together with the attached apparatus, such as the radiant heaters and the charge feeding mechanism. As indicated hereinbefore, the removal is a simple operation, and requires only that the metal in the peripheral lute be melted.

Referring now to Fig. 3, the apparatus illustrated is substantially similar to that of Figs. 1 and 2 except that the rabble is kept stationary while the hearth is rotated. To this end, the hearth is provided with a concentric gear 80 that is disposed around the drop pipe immediately below the hearth. This gear meshes with a driving gear 81 disposed on the end of a conventional horizontal drive shaft 82. The hearth is permitted to rotate by reason of the fact that a thrust bearing or rotatable connection 83 is provided in the drop pipe just below the driving gear. The upper portion 84 of the drop pipe is rotatable while the lower portion 85 is fixed. As indicated above, the shaft supporting the rabble is mounted concentrically and is fixed in a central pier 86 below the furnace structure. The shaft is surrounded for a portion of its length by a hydrogen inlet pipe 87 which projects upwardly from a hydrogen supply line 88 to a star-shaped hydrogen outlet manifold 89 that communicates with the gas chamber of the hearth. The upper portion of the hydrogen supply pipe is rotatable, upper and lower portions being fastened together with a rotatable coupling 90 at the same level as the rotatable connection 83 in the drop pipe. The material being discharged from the furnace falls through the drop pipe between the spokes of the star-shaped hydrogen outlet and out through a sloping conduit 91 into the well, which is the same in structure as that of Figs. 1 and 2. The conduit and drop pipe should be provided with a conventional cooling jacket, not shown.

As in the case of the apparatus of Figs. 1 and 2, water vapor or other heavy gaseous reduction product is removed from the furnace at a level below that of the bed of the hearth through the discharge pipe 70.

In the operation of the apparatus of Fig. 3, the metal in the peripheral lute which seals the hearth to the shell must be kept molten at all times since the annular channel of the lute is mounted on the hearth and rotates therewith while the ring within the channel is mounted on the shell and is stationary.

The apparatus of Fig. 4 is in general similar to that of Figs. 1 and 2. However, in the apparatus of Fig. 4 solid material to be treated is delivered near the center of the hearth and is raked outward to one or more drop holes at the periphery of the hearth. Thus, the charge pipe is centrally disposed in the furnace shell and the rakes on the rabble are turned at such an angle that they move the charge outwardly toward a drop hole 100 located at the outer edge of the hearth. This drop hole communicates with a vertical drop pipe 101 that feeds directly into the luted chamber or well. This drop pipe and the chamber should be provided with cooling jackets (not shown).

In the apparatus of Fig. 4, the hearth is stationary and the rabble is rotated by means of the centrally disposed vertical shaft provided with a horizontal gear 102 near its lower extremity. This gear meshes with a gear 103 on the end of a horizontal drive shaft 104.

Instead of having a single lifting eye, the furnace of Fig. 4 is provided with a plurality of eyes 105, 106 equally spaced off center. The furnace shell may be raised and removed from the hearth, to which it is sealed during operation by means of the same type of peripheral molten metal seal that is provided in the apparatus of Figs. 1 and 2.

The treatment of material in furnace of Figs. 3 and 4 is substantially the same as that described in conjunction with Figs. 1 and 2 for the reduction of finely-divided metallic compounds without substantial fusion. The material is fed continuously at the charge pipe and moves as a thin bed across the hearth. Hydrogen or other reducing gas is fed upwardly through the hearth. The upward movement of the gas through the bed tends to agitate it and keep it in a state of semi-suspension so that movement thereof across the hearth is facilitated.

As indicated hereinbefore, the apparatus may be used for processes other than reduction. Thus, iron powder may be carburized by causing it to pass across the hearth while a current of hydrocarbon gas is passed upwardly in contact therewith. Likewise, metal powders may be nitrided by passing nitrogen in contact therewith on the porous hearth.

Figure 5:
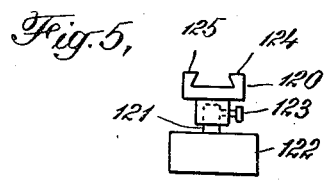
Fig. 5 illustrates a rake, the angle of which is adjustable to give optimum operation conditions for the material undergoing treatment in the furnace.

As indicated hereinbefore, the rakes are set obliquely to the longitudinal axis of the rabble in order to move the material undergoing treatment in a spiral path across the hearth. The particular angle made by a rake with respect to the rabble arm will depend upon the nature of the material undergoing treatment. Thus all of the rakes on the arm may be set at the same angle with respect to the longitudinal axis of the arm, or they may be set at different angles so that the rate of movement across the hearth will vary from point to point. In these circumstances it is desirable to employ rakes provided with blades which can be set at various angles. Such a blade is illustrated in Fig. 5 and comprises a holder 120 adopted to hold the rake on the rabble arm in any conventional manner, as by ribs 124, 125 that fit over the web of a rabble arm. The holder has a vertical cylindrical hole in the lower portion in which a shank 121, formed integrally with a blade 122, is held by means of a set screw 123.

I claim:

1. In a metallurgical furnace, the combination which comprises a porous hearth, a rabble disposed above said hearth and adapted to move finely-divided solid material thereover, means for imparting rotary movement of the rabble relative to and around the hearth, means for forcing gas upwardly through the porous hearth, a removable furnace shell extending above the hearth and enclosing the rabble and having a joint with the hearth, and means for sealing the joint between the shell and the hearth.

2. In a metallurgical furnace, the combination which comprises a porous hearth, a rabble disposed above said hearth and adapted to move finely-divided solid material thereover, means for imparting rotary movement of the rabble relative to and around the hearth, means for forcing gas upwardly through the porous hearth, a removable furnace shell extending above the hearth and enclosing the rabble and having a joint with the hearth, and a peripheral lute containing metal disposed around the hearth and sealing the joint between the hearth and the shell.

3. In a metallurgical furnace, the combination which comprises a porous hearth, a rabble disposed above said hearth and adapted to move finely-divided material thereover, means for imparting rotary movement of the rabble relative to and around the hearth, means for forcing gas upwardly through the porous hearth, a removable furnace shell extending above the hearth and enclosing the rabble and having a joint with the hearth, means for sealing the joint between the hearth and the furnace shell comprising a peripheral lute containing metal and heating means for rendering the metal in the lute molten.

4. In a metallurgical furnace, the combination which comprises a porous hearth, a rabble disposed above said hearth, means for imparting rotary movement of the rabble relative to and around the hearth, means for forcing gas upwardly through the porous hearth, a removable furnace shell extending above the hearth and enclosing the rabble, a radiant heater mounted within the furnace shell on the wall thereof and a peripheral seal for sealing the joint between the shell and the hearth.

5. In a metallurgical furnace, the combination which comprises a porous hearth the upper surface of which is composed of refractory containing finely-divided metal, a rabble disposed above said hearth, means for imparting rotary movement of the rabble relative to and around the hearth, means for forcing gas upwardly through the porous hearth, a removable furnace shell extending upwardly from the hearth and a peripheral seal around the hearth for sealing the joint between the shell and the hearth.

6. In a metallurgical furnace, the combination which comprises a porous hearth including an upper wall of porous refractory underlain by a gas chamber, a rabble mounted above the hearth and adapted to move material across it, means for rotating the hearth, means for forcing gas upwardly through the porous refractory, a removable furnace shell extending upwardly from the hearth and enclosing the rabble, and a peripheral molten metal seal around the hearth between the hearth and the shell.

7. In a metallurgical furnace, the combination which comprises a porous hearth including an upper porous refractory wall underlain by a gas chamber, a rabble disposed above said hearth, a shaft for driving the rabble projecting upwardly through said hearth and connected to the rabble, a removable furnace shell extending upwardly from a point adjacent the hearth and enclosing the rabble, means for forcing gas upwardly through the porous hearth into the space enclosed by the furnace shell, means for rotating the shaft, and means for sealing the joint between the shell and the hearth.

8. In a metallurgical furnace, the combination which comprises a hearth member having a porous upper wall underlain by a gas chamber, means for forcing gas into the chamber and through the porous upper wall, a rotary rabble disposed above said hearth, means for imparting rotary movement of the rabble relative to the hearth, a removable furnace shell extending upwardly from a peripheral joint adjacent the hearth and enclosing the rabble, means for sealing the joint between the shell and the hearth, and a radiant tube heater disposed within the shell and projecting through a wall thereof.

9. Apparatus according to claim 8 provided with a feeder for finely-divided solids mounted in the removable furnace shell and having means for withdrawing gas from the space enclosed by the shell consisting of a conduit beginning at a point below the hearth.

10. Apparatus according to claim 8 having an outlet conduit for solid finely-divided material at approximately the center of the hearth, with a drive shaft for the rabble projecting upwardly through the conduit.

11. Apparatus according to claim 8 provided with a peripheral metal-filled lute which seals the joint between the removable shell and the hearth.

12. Apparatus according to claim 8 in which the rabble is provided with leveling bar for maintaining a very thin layer of finely-divided material on the hearth.

13. Apparatus according to claim 8 in which the rabble is provided with rakes having blades that are angularly adjustable with respect to the longitudinal axis of the rabble.

RAYMOND L. PATTERSON.